United States Patent
Poorman

(10) Patent No.: US 6,610,336 B2
(45) Date of Patent: Aug. 26, 2003

(54) PROCESS FOR MAKING ICE POPS

(75) Inventor: Mike Poorman, Bakersfield, CA (US)

(73) Assignee: Ice Cream Partners USA, LLC, San Ramon, CA (US)

( * ) Notice: Subject to any disclaimer, the term of this patent is extended or adjusted under 35 U.S.C. 154(b) by 331 days.

(21) Appl. No.: 09/819,908

(22) Filed: Mar. 28, 2001

(65) Prior Publication Data
US 2003/0026882 A1 Feb. 6, 2003

(51) Int. Cl.$^7$ ................................. A23L 1/05
(52) U.S. Cl. .................. 426/100; 426/565; 426/577; 426/524; 426/515
(58) Field of Search .................. 426/100, 565, 426/577, 524, 515

(56) References Cited

U.S. PATENT DOCUMENTS

| | | | |
|---|---|---|---|
| 4,119,739 A | * 10/1978 | Barwick et al. | ............ 426/573 |
| 4,140,807 A | 2/1979 | Braverman | ............ 426/573 |
| 4,143,172 A | * 3/1979 | Mitchell et al. | ............ 426/532 |
| 4,216,242 A | 8/1980 | Braverman | ............ 426/573 |
| 5,425,958 A | 6/1995 | Fazio et al. | ............ 426/101 |
| 6,379,724 B1 | * 4/2002 | Best et al. | ............ 426/68 |
| 6,461,653 B1 | * 10/2002 | Cox | ............ 426/88 |
| 2002/0168452 A1 | * 11/2002 | Best et al. | ............ 426/100 |

* cited by examiner

Primary Examiner—Nina Bhat
(74) Attorney, Agent, or Firm—Ginger R. Dreger, Esq.; Heller Ehrman White & McAuliffe LLP

(57) ABSTRACT

A process for making confection compositions such as ice pops of gel consistency, in the absence of heat treatment which takes advantage of a chemical reaction between an alginate salt, other than calcium alginate, or a low methoxy pectin and free calcium provides a homogeneous gel product which can be subsequently depositing into a mold pocket and converted into a desired product such as an ice pop by traditional steps.

13 Claims, 2 Drawing Sheets

PROCESS FOR MAKING ICE POPS

BACKGROUND OF THE INVENTION

1. Field of the Invention

The present invention relates to gel-like confection compositions, especially ice pops. In particular, the present invention relates to a new process for making ice pops of gel-like consistency.

2. Description of the Related Art

For many years, frozen novelty products have existed and have adapted to anticipate and meet consumer demand. The basic formulation for frozen novelty products generally includes an edible, aqueous, flavored confection sealed in plastic packs, such as those made of polyethylene, cellophane and other similar films. The variety of frozen novelty products ranges from pudding-like opaque confection (U.S. Pat. No. 4,140,807) to ice-cream or frozen yogurt based products (U.S. Pat. No. 5,425,958) to fruit and juice bars. The composition can be sold in frozen form or, alternatively as a liquid at room temperature, which can be subsequently frozen prior to consumption.

According to U.S. Pat. No. 4,216,242, the major factors for insuring high quality, stable, mass-produced, liquid to semi-solid, freezable confections include adequate preservation by hot filling, elimination of physical deterioration prior to freezing, and the prevention of settling of solid particles while the product is hot and fluid by enforcing a stabilizer system. The stabilizer system is based on microcrystalline cellulose in combination with carboxymethyl cellulose (CMC), salt of alginic acid (alginate), xanthan gum, and modified starch. The stabilizer components provide the composition with homogeneity, stability and consistency in both frozen and unfrozen states.

Traditionally, frozen gelled novelty products have been formed from a single mixture of the necessary ingredients. For example, a single mixture can be heated and allowed to cool in a mold to form a gel. In another example, the frozen novelty product is not made upon heating, but instead, has a milk, ice cream or yogurt base (see, e.g. U.S. Pat. No. 5,425,958). Lastly, freeze-it-yourself pops have been formed from a mixture that has low-methoxyl pectin alone, carrageenan alone, a combination of low-methoxyl pectin and carboxymethylcellulose or a combination of carrageenan and carboxymethylcellulose which provides the composition with homogeneity, stability and the required consistency in both frozen and unfrozen states (U. S. Pat. No. 4,140,807).

SUMMARY OF THE INVENTION

The present invention concerns a novel process for making ice pops of gel-like consistency, in the absence of heat treatment. The invention is based on the experimental finding that from two otherwise traditional water ice base mixes, a stable gel-like water ice product can be produced without heat treatment, taking advantage of a chemical reaction between an alginate salt other than calcium alginate (e.g. sodium alginate) or a low-methoxyl (LM) pectin, and free calcium. The resultant homogenous gel-like product can be subsequently deposited into a mold pocket and converted into a desired product, such as an ice pop, by traditional steps.

Accordingly, in one aspect the invention concerns a process for making a gel-like water ice composition comprising the steps of:

(a) providing a first aqueous mix comprising (i) from about 0.8 to about 2.4% by weight of a stabilizer blend comprising a non-calcium salt of alginic acid or a low-methoxyl (LM) pectin, and a calcium salt;
(ii) from about 2 to about 10% by weight of a freezing point depressant, such as corn syrup;
(iii) from about 15 to about 40% by weight of a sugar; and
(iv) water in an amount sufficient to adjust density to about 9.5 to 10.5 lbs/gal;

wherein the pH of this first aqueous mix is about 4.5 to 7.0;

(b) providing a second aqueous mix comprising (i) from about 0.1 to about 0.5% by weight of a stabilizer blend;
(ii) from about 1 to about 6% by weight of a freezing point depressant, such as corn syrup,
(iii) an acid in an amount to adjust the pH to about 2.5 to 4.1 upon admixture with said first aqueous mix; and
(iv) water in an amount sufficient to adjust density to about 8.5 to 9.5 lbs/gal;

wherein at least one of said first and second mixes additionally comprises at least one flavoring or coloring agent sufficient to impart the desired flavor or color to said water ice composition; and (c) admixing said first and second aqueous mixes whereby a gel-like composition is formed.

In the foregoing process, the concentrations of all ingredients are expressed as a percentage of the total weight of the first and second mix, respectively, in which they are present.

The acid used can be any edible acid, and preferably is citric acid, which is used in an amount to adjust the pH of the composition obtained by mixing the first and second mixes to about 2.5 to 4.1, preferably to about 3.0 to 4.0, more preferably to about 3.0 to 3.8. The gel formed can then be deposited in a mold of desired shape, and processed by steps conventionally used in the production and formulation of water ice products, such as ice pops.

The invention further concerns gel-like confection compositions and, in particular, ice pops prepared by the foregoing process.

DETAILED DESCRIPTION OF THE PREFERRED EMBODIMENTS

Figure 1:
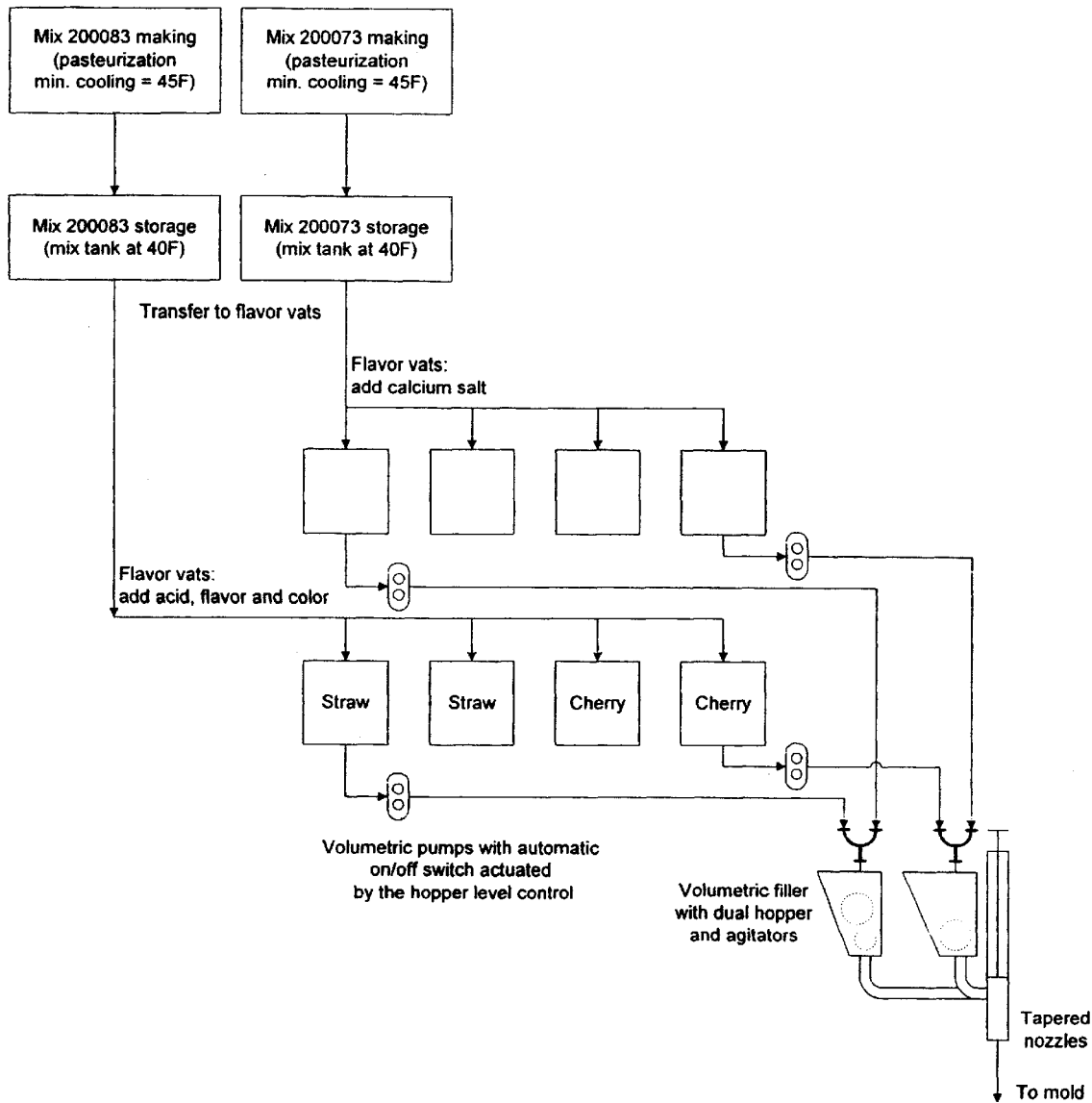
FIG. 1 is a schematic illustration of a process according to the invention.
Figure 2:
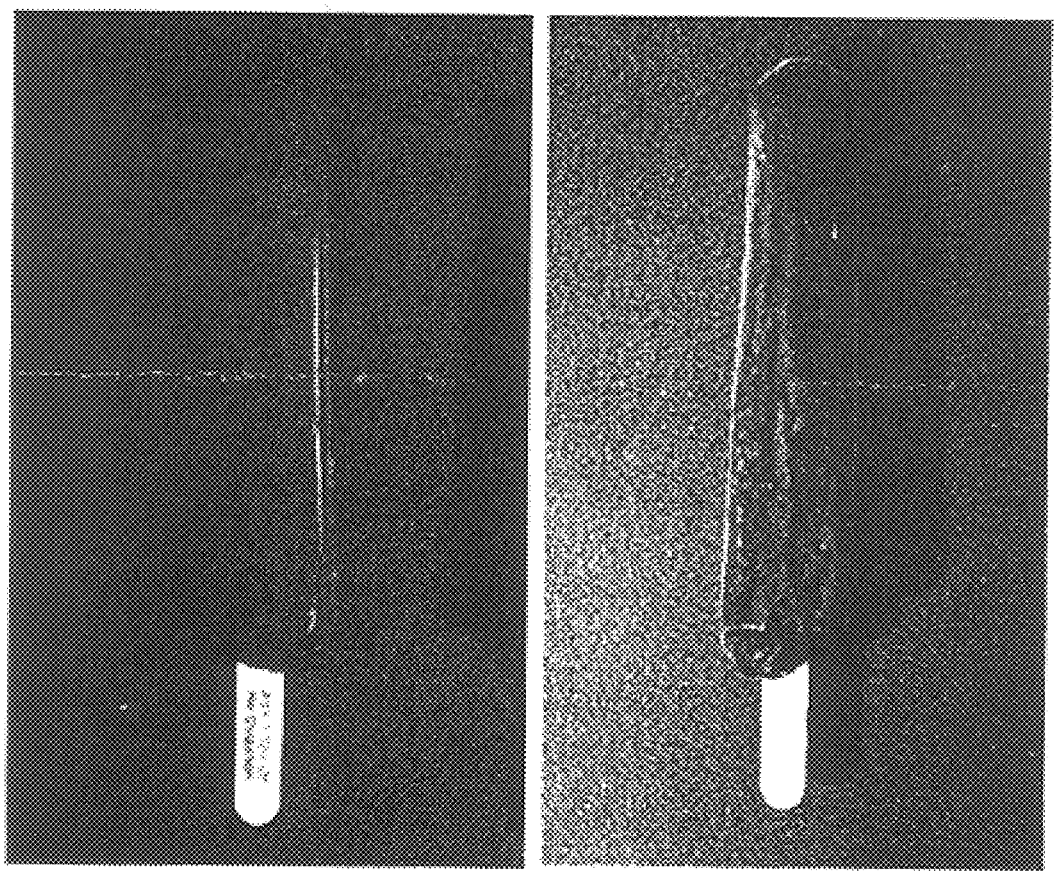
FIG. 2 is a side view of a frozen ice pop that depicts the target and acceptable texture of the ice pop of the invention.

The process of the present invention takes advantage of a chemical reaction between a salt of alginic acid, such as sodium alginate, or a low-methoxyl (LM) pectin, and free calcium to produce, without heat treatment, a product having a gel-like consistency which can then be converted into a desired confection product, such as an ice pop. The process involves the use of two separate water ice mixes.

In one embodiment, the first water-ice mix comprises an alginic acid salt other than calcium alginate (e.g. sodium alginate) and a calcium salt, such as tricalcium phosphate, dicalcium phosphate, calcium pyrophosphate, etc., along with traditional ingredients including a freezing point depressant, e.g. corn syrup, sugar, water, and optionally flavorings, colorings, stabilizers, etc., and has a pH at which the chemical reaction between the alginate and the calcium salt is suppressed. In this context, "suppression" means that either there is no chemical reaction, or any chemical reaction that might take place is very slow.

In another embodiment, the first water-ice mix comprises a low-methoxyl pectin (LM pectin) instead of the alginic acid salt, along with a calcium salt and other ingredients listed above. In the present invention, the term "low-methoxyl pectin" or "LM pectin" refers to pectins having degrees of esterification of not higher than 50%. Examples of LM pectin include pectins of citrus fruits such as lemon, lime, orange and grapefruit, and apple pectin.

The first aqueous mix typically contains from about 0.8 to about 2.4% by weight, preferably from about 1.0 to about 2.2% by weight, more preferably from about 1.2 to about 2.0% by weight of the stabilizer blend. The typical amount of an alginate-containing stabilizing blend in the first aqueous mix is from about 0.8 to about 1.8% by weight, preferably from about 1.0 to about 1.6% by weight, more preferably from about 1.2 to about 1.4% by weight. The typical amount of a LM pectin-containing stabilizer blend in the first aqueous mix is from about 1.4 to about 2.4% by weight, preferably from about 1.6 to about 2.2% by weight, more preferably from about 1.8 to about 2.0% by weight. The basic stabilizer blend, to which the alginate or LM pectin and the calcium salt are added, can be any stabilizer blend traditionally used in the production of water ice products. Such stabilizer blends typically contain a combination of hydrocolloids such as guar (a galactomannan), locust bean gum, carrageenan, carboxymethyl cellulose, etc. A specific blend illustrated in the examples contains Guar Gum, Dextrose, and Karaya Gum. Stabilizer blends are well known in the food industry and are commercially available.

The first aqueous mix further contains from about 2 to about 10% by weight, preferably from about 4 to about 9% by weight, more preferably from about 6 to about 8% by weight of a freezing point depressant. The freezing point depressant is a component having a freezing point depressing action. Corn syrup, a sweet, thick syrup with a caramel flavor, is an example of the freezing point depressants suitable for use in the methods and products of the present invention. However, there are no particular restrictions on the type and usage form of the freezing point depressant. Any freezing point depressant suitable for human consumption may be used.

The sugar component of the first aqueous mix can be any sugar, including (liquid) sucrose, fructose, maltose, dextrose, and the like, and is present in a concentration of from about 15 to about 40% by weight, more preferably from about 20 to about 30% by weight, even more preferably from about 25 to about 30% by weight.

Finally, the first aqueous mix contains water to adjust density to about 9.5 to 10.5 lbs/gal. The pH of the first aqueous mix typically is between about 4.5 and 7.0, preferably between about 4.8 and 5.5, more preferably between about 5.0 and 5.5.

The key component in the second mix is an acid, which can be any edible acid, such as citric acid, lactic acid, phosphoric acid, and the like. In addition, the second aqueous mix comprises from about 0.1 to about 0.5% by weight, preferably from about 0.2 to about 0.4% of a stabilizer blend (not containing any alginate, LM pectin or calcium salt), and from about 1 to about 6% by weight, preferably from about 3 to about 5% by weight, more preferably from about 4 to about 5% by weight of a freezing point depressant, e.g. corn syrup, water to adjust density to about 8.5 to 9.5 lbs/gal, optionally along with traditional ingredients, such as thickeners, sweeteners, e.g. (liquid) sucrose, fructose, maltose, dextrose, and other sugars, flavorings, colorings and the like.

When the two mixes are combined, the acid present in the second mix lowers the pH of the resultant mixture to about 2.5 to 4.1, preferably to about 3.0 to 4.0, more preferably to about 3.0 to 3.8, frees up the calcium from the calcium salt, e.g. tricalcium phosphate present in the first mix, and allows it to react with the alginate salt, e.g. sodium alginate, or with the LM pectin. The result is the formation of a stable gel-like composition, which can then be further processed by traditional steps.

As noted before, the compositions of the present invention may comprise traditional stabilizers such as, for example, guar gum, karaya gum, carboxymethyl cellulose (CMC), and the like; agents to depress the freezing point, e.g. corn syrup;

thickeners; sweeteners, such as (liquid) sucrose, fructose, maltose, dextrose, and other sugars; and flavorings and colorings to produce the desired product. The freezing point depressant and optional sugar (sweetener) present in the second aqueous mix is defined as discussed in connection with the first aqueous mix. The basic stabilizer blend, the freezing point depressant, and the sugar present in the first and second aqueous mixes may, but do not need to be, the same.

Ice water based confections, such as ice pops, can be prepared with many different flavors, and may have different colors. In a preferred embodiment, the invention concerns fruit-flavored pops (with or without a stick). The flavor can be that of a higher-acid fruit, such as cherry, strawberry, blueberry, lemon, or orange; lower acid fruit, such as pineapple, mango, melon, coconut; or non-acid fruit, such as banana. However, the invention is not limited to the preparation of fruit flavored products, such as pops. Virtually any flavor can be added that does not result in bad taste at a pH below 4.2.

The compositions preferably contain food colorings. These food colorings include, but are not limited to, U.S. Certified Food Colors, such as Red 40, Red Liq 417, Red 3, Yellow 5, Yellow 6, and Blue 1. Although not required, food colorings are included to enhance the aesthetic desirability of the compositions. Food colorings also help consumers associate the color with the flavor. For example, strawberry flavor can be died red and blueberry flavor might be died blue, etc.

The compositions may additionally contain preservatives, such as, for example, sodium benzoate or potassium sorbate.

The compositions of the present invention are frozen or freezable, and are packaged in conventional ways. For example, the compositions may be converted into ice pops, with or without a stick inserted therein.

The process of the present invention does not involve heat treatment other than heat necessary for pasteurization. As a result of the chemical reaction between calcium (freed from a calcium salt, such as tricalcium phosphate) and alginate, e.g. sodium alginate or a LM pectin, a homogenous gel is formed, which can be further processed without any heat treatment.

Further details of the invention are illustrated by the following non-limiting example.

EXAMPLE

Preparation of Ice Pops

This example describes the preparation of ice pops by a process that involves processing and subsequent mixing of two base mixes, designated Base Mix Number 200073 and Base Mix Number 200083, under proper conditions, as described below, to form a gel-like product. The process is illustrated by the flow chart shown in FIG. 1, and is described in detail below.

A. Base Mix Processing

Base Mix Number E200073 (Water Ice Base Mix Slick Licks) is a fairly viscous mix containing sodium alginate. Base Mix Number E200083 (Splash Pop Water Ice Base Mix) is a water ice base mix. To each of Base Mix Numbers E200073 and E200083, held in two separate batch tanks, there was added liquid sucrose, liquid corn syrup, and water, and each mixture was circulated to a separate liquifier where the stabilizer was added. The composition of Base Mix Number E200073 after supplementation is shown in the following Table 1.

TABLE 1

| Ingredient | Weight (lb.) | % Comp | % Sugar | % Misc. Solids | % Total solids |
|---|---|---|---|---|---|
| Liquid Water | 642.64 | 35.505 | — | — | — |
| Liquid Sucrose | 995.5 | 55.000 | 66.5 | — | 36.575 |
| Liquid Corn Syrup | 146.52 | 8.095 | 18 | 32.6 | 6.5 |
| Stabilizer Blend* | 25.34 | 1.400 | — | 95 | 1.33 |
| Total: | 1810 | 100.000 | 18.233 | 8.195 | 44.405 |

*The stabilizer blend was made up of Sodium Alginate, Guar Gum, Dextrose, and Karaya Gum.

The composition of E200083 Base Mix after supplementation was as follows:

TABLE 2

| Ingredient | Weight (lbs.) | % Comp. | % Sugar | % Misc. Solids | % Total Solids |
|---|---|---|---|---|---|
| Liquid Sucrose | 463.78 | 25.564 | 66.5 | — | 17 |
| Liquid Corn Syrup | 102.05 | 5.625 | 18 | 62.3 | 4.517 |
| Water | 1242.93 | 68.511 | — | — | — |
| Stabilizer Blend** | 5.44 | 0.3 | 0.015 | 0.266 | 0.281 |
| Total: | 1814.2 | 100.00 | 84.515 | 62.566 | 21.798 |

**The stabilizer blend was made up of Guar Gum, Dextrose, and Karaya Gum.

Each base mix was then sent to a HTST (High Temperature Short Time) for pasteurization, where it was heated to 182° F. and held at this temperature for 30 seconds. The mixes were then separately homogenized at 1000 psi single stage, and stored at 38° F. in two separate bulk mix tanks. The supplemented base mixes have the following specification:

| 200073 | | 200083 | |
|---|---|---|---|
| Milk fat: | 0.00% | Milk fat: | 0.00% |
| Total fat: | 0.00% | Total fat: | 0.00% |
| Total solids: | 44.4% | Total solids: | 21.8% |
| Density: | 9.972 lbs./gal. | Density: | 9.071 lbs./gal. |
| Standard plate count: | ≦10,000 CFU/g | Standard plate count: | ≦10,000 CFU/g |
| Coliform - Petrifilm: | ≦10 CFU/g | Coliform - Petrifilm: | ≦10 CFU/g |
| Escherichia coli: | ≦1/g or negative | Escherichia coli: | 1/g or negative |
| Listeria: | Negative | Listeria: | Negative |

B. Mix Flavoring

Each of the mixes obtained in step A above was pumped to a flavor vat where the required ingredients were added.

Mix E200073 supplemented as described above, was pumped to four vats, and flavored with tricalcium phosphate slurried in 10× its weight in water. The composition of the resultant calcium-containing flavor vat formula is shown in the following Table 3.

TABLE 3

Flavor Calcium Slicklicks

| Ingredients | Density (lb/gal) | Pounds | Gallons | % W/W | %V/V |
|---|---|---|---|---|---|
| Supplemented E200073 | 9.972 | 997.20 | 100 | 99.90 | 99.92 |
| Calcium Phosphate | 12.639 | 1.00 | 0.08 | 0.10 | 0.08 |
| TOTAL: | | 998.20 | 100.08 | 100.00 | 100.00 |

Specific gravity: 1.195
Density: 9.972 lbs /gal.

Mix E200083 supplemented as described in step A above, was pumped to four vats. Two of the mixtures were flavored cherry and two were flavored strawberry. The compositions of the strawberry and cherry flavored mixtures are shown in the following tables 4 and 5.

TABLE 4

Strawberry Flavored Mixture

| Article # | Ingredients | Density (lb/gal) | Pounds | Gallons | % W/W | % V/V |
|---|---|---|---|---|---|---|
| | Supplemented E200083 | 9.071 | 907.10 | 100.00 | 97.20 | 97.41 |
| | 50% Citric Acid Solution | 10.370 | 18.67 | 1.80 | 2.00 | 1.75 |
| | Color Red Liq 418 | 8.345 | 1.87 | 0.22 | 0.20 | 0.21 |
| | Flavor Strawberry | 8.810 | 5.60 | 0.64 | 0.60 | 0.63 |
| TOTAL: | | | 933.23 | 102.66 | 100 | 100 |

TABLE 5

Cherry Flavored Mixture

| Article # | Ingredients | Density (lb/gal) | Pounds | Gallons | % W/W | % V/V |
|---|---|---|---|---|---|---|
| | Supplemented E200083 | 9.071 | 907.10 | 100.00 | 96.30 | 96.40 |
| | 50% Citric Acid Solution | 10.370 | 18.84 | 1.82 | 2.00 | 1.75 |
| | Color Red Liq 418 | 8.345 | 13.19 | 1.58 | 1.40 | 1.52 |
| | Flavor Cherry | 8.640 | 2.83 | 0.33 | 0.30 | 0.32 |
| TOTAL: | | | 941.96 | 103.73 | 100.00 | 100.00 |

Agitation and blending of the ingredients was continued until the mix was homogenous. The mix was then pumped from the flavor vat to the hopper.

C. Processing

The mixes from the previous step were pumped to a split hopper using four pumps with variable frequency drives. Into one side of the hopper, the mix shown in Table 3 was pumped along with cherry flavored mix shown in Table 5. Into the other side, the mix of Table 3 was pumped along with strawberry flavored mix of Table 4. The mixes were added to the hopper at a 50/50 ratio by weight through a U-junction above both hoppers. Each side of the split hopper contained a horizontal agitator at the bottom, and was equipped with a high/low level control. The mix was then filled into a 1.75-oz mold, sticks were added, and the bars were extracted and sent to wrapping.

When the two mixes are combined in the hopper, the citric acid in the second, cherry or strawberry flavored mix lowers the pH of the first mix, containing tricalcium phosphate. Lowering of the pH frees up calcium from the tricalcium phosphate salt, and allows it to react with the sodium alginate. The reaction forms a gel, which is then deposited into the mold pocket and handled like a typical water ice pop, as described above.

The composition of the final product is shown in Table 6 below.

TABLE 6

Nest Slickety Lick

| Grams Per Piece | ml Per Piece | Ingredient | Density | % Weight | % Volume | O/R % |
|---|---|---|---|---|---|---|
| 28.80 | 25.31 | Flavor Calcium Slicklicks | 1.195 | 25.0 | 23.835 | 5 |
| 28.80 | 27.76 | Flavor Wice Straw Slicklick | 1.089 | 25.00 | 26.150 | 5 |
| 28.80 | 25.31 | Flavor calcium Slicklicks | 1.195 | 25.00 | 23.835 | 5 |
| 28.80 | 27.79 | Flavor Wice Cherry Slicklick | 1.088 | 25.00 | 26.179 | 5 |

All references cited throughout the disclosure are hereby expressly incorporated by reference. It is understood that the application of the teachings of the present invention to a specific problem or situation will be within the capabilities of one having ordinary skill in the art in light of the teachings contained herein. Examples of the products of the present invention and representative processes for their production and use should not be construed to limit the invention.

What is claimed is:

1. A process for making a water ice gel confiction confection composition comprising the steps of:

(a) providing a first aqueous mix comprising (i) from about 0.8 to about 2.4% by weight of a stabilizer blend comprising a non-calcium salt of alginic acid or a low methoxyl pectin (LM-pectin), and a calcium salt;
    (ii) from about 2 to about 10% by weight of a freezing point depressant; and
    (iii) from about 15 to about 40% by weight of a sugar; and
    (iv) water in an amount sufficient to adjust density to about 9.5 to 10.5 lbs/gal;

wherein the pH of said first aqueous mix is about 4.5 to 7.0;

(b) providing a second aqueous mix comprising (i) from about 0.1 to about 0.5% by weight of a stabilizer blend;
    (ii) from about 1 to about 6% by weight of a freezing point depressant;
    (iii) an acid in an amount to adjust the pH to about 2.5 to 4.1 upon admixture with said first aqueous mix; and
    (iv) water in an amount sufficient to adjust density to about 8.5 to 9.5 lbs/gal, wherein at least one of said first and second mixes additionally comprises at least one flavoring or coloring agent sufficient to impart the desired flavor or color to said water ice composition; and (c) admixing said first and second aqueous mixes whereby a water ice gel confection composition is formed.

2. The process of claim 1 wherein said calcium salt is tricalcium phosphate.

3. The process of claim 1 wherein said non-calcium salt of alginic acid is sodium alginate.

4. The process of claim 1 wherein said freezing point depressant is corn syrup.

5. The process of claim 1 additionally comprising the step of pasteurizing said first and second mixes.

6. The process of claim 1 wherein the acid in said second mix is citric acid in an amount to adjust the pH to 3.0 to 4.0 when admixed with said first mix.

7. The process of claim 6 wherein said citric acid is present in an amount sufficient to adjust the pH to 3.0 to 3.8 when admixed with said first mix.

8. The process of claim 1 further comprising the step of filling said water ice gel confiction composition into a mold.

9. The process of claim 6 wherein said mold has the shape of an ice pop.

10. The process of claim 9 further comprising the step of adding a stick to each mold.

11. The process of claim 10 further comprising the step of extracting the ice pop shaped products from said mold, and individually wrapping each product.

12. A water ice gel confiction confection composition prepared by the process of claim 1.

13. An ice pop prepared by the process of claim 11.

* * * * *